July 21, 1931. F. D. SMITH, JR 1,815,636
HEAT INDICATOR
Filed Aug. 17, 1927

Inventor
Frank D. Smith Jr.
By Blackmore, Spencer & Flint
Attorneys

Patented July 21, 1931

1,815,636

UNITED STATES PATENT OFFICE

FRANK D. SMITH, JR., OF FLINT, MICHIGAN, ASSIGNOR TO A C SPARK PLUG COMPANY, OF FLINT, MICHIGAN, A COMPANY OF MICHIGAN

HEAT INDICATOR

Application filed August 17, 1927. Serial No. 213,627.

This invention relates to heat indicators used in connection with thermostats for controlling the cooling of internal combustion engines, particularly those used on automotive vehicles.

It is common practice in this type of engine to cool the combustion chamber and cylinder walls by the circulation of a fluid (usually water) through certain engine passages and a radiator. It is also common to employ certain thermostatically controlled means located in these passages in order to stop fluid circulation until the engine temperature has reached a certain predetermined value.

In the preferred form of the present invention the thermostatic control element comprises a thermostat in the form of a bellows which is confined in an appropriately shaped cup and which is filled with a suitable liquid such as ether or a mixture of alcohol and carbon tetrachloride which are very sensitive to heat changes. The thermostat is operatively connected to a shut off valve in the fluid return line to control the flow of the cooling fluid. By the present invention I propose to connect a suitable pressure gage with the inside of this thermostat in such a manner that the pressure within the thermostat will be measured and will serve as an indication of the engine temperature.

Further, since the opening of the fluid shut off valve is dependent upon the pressure within the thermostat, the gage will indicate whether or not the shut off valve is functioning properly. The liquid is sealed within the thermostat at a pressure below atmospheric so that in case a break occurs in the thermostat the pressure will rise to atmospheric and the spring action of the thermostat will cause the thermostat to expand and thus open the valve and allow fluid circulation. The gage is accordingly connected to the thermostat in such a manner that indications of pressures below atmospheric will show the valve to be closed and indications of pressures above atmospheric will show the valve to be open. This is of especial value on cold days when it is most desirable to restrict the fluid circulation until the engine has warmed up to an efficient operating temperature. If upon starting a cold engine the operator notices that the pointer stands at "open" instead of "closed" he will know at once that there is a leak in the thermostat system and that the shut off valve is not functioning.

In automobile installations I preferably apply my heat indicating device to the instrument board where it may illuminated at all times by the usual dash light.

The object of the invention is accomplished by placing in the upper portion of the radiator a heat sensitive element, preferably in the form of a thermostat, which is confined in an appropriately shaped cup and which is filled with a suitable liquid, such as ether or a mixture of alcohol and carbon tetrachloride which are very sensitive to heat changes. In order that the pressure within the thermostat may be transmitted to the heat indicating device, I connect the interior of the thermostat by means of a length of tubing with the heat indicator at the instrument board. The thermostat is positioned at the mouth of the engine outlet of the cooling system and has affixed thereto a stem upon which is secured a valve which normally closes the outlet but which will be opened as the thermostat expands.

The inside of the cup has a flange which limits the expansion of the thermostat and after the tube has expanded so as to contact with the flange the indicator pointer will show that the temperature of the cooling system of the water indicates that the engine is running at its most efficient speed. Further pressure within the thermostat will not cause its extension but will build up the pressure therein which will be shown by the heat indicator at the instrument board.

The invention is disclosed in the accompanying drawings in which.

Figure 1:
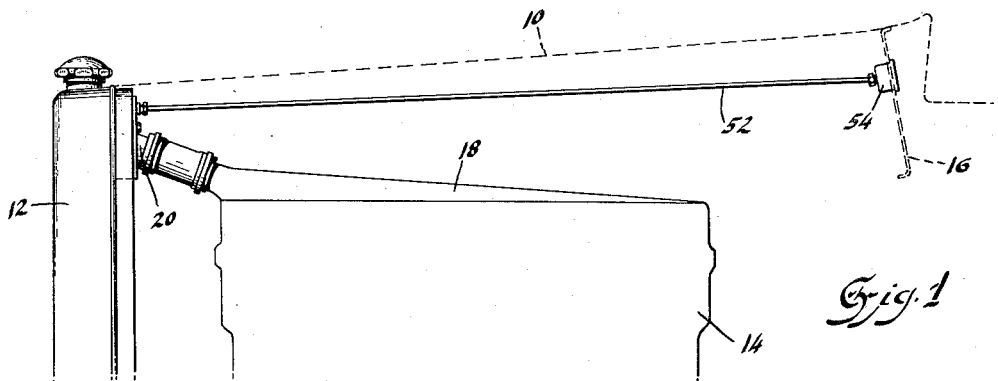
Figure 1 is a side view of the front portion of an automotive vehicle showing the application of the invention thereto.

Referring to the numbered parts on the drawing, 10 indicates the hood of an automotive vehicle, 12 the radiator, 14 the engine and 16 the instrument board. The engine has the usual cooling system 18, the outlet 20 of which is shown as leading to the upper portion of the radiator.

The outlet 20 terminates in a housing or cup-shaped portion 22 having at one end a flange 24 to limit the outward expansion of a thermostat 26 enclosed within the cup and secured to the closed end thereof by means of a bolt or rivet 28. The cup in turn is secured to the rear portion 30 of the radiator by means of the nut 32 threaded onto a stud or bolt 34, which may be an extension of the rivet 28.

The opposite end of the thermostat has secured thereto a stem 36, which holds a valve 38, normally resting on the seat 40 formed on the open end of a cup 22. The valve is secured to a stem 36 by means of a nut 42.

The opposite end of the thermostat is provided with an opening 44 which coincides with openings 46 in the body of the cup and the rear portion of the radiator. Through these openings there is passed the hollow plug 48 into which is threaded a plug 50 to which is attached the tube 52 leading to the heat indicator 54 fixed to the instrument board 16.

Figure 2:
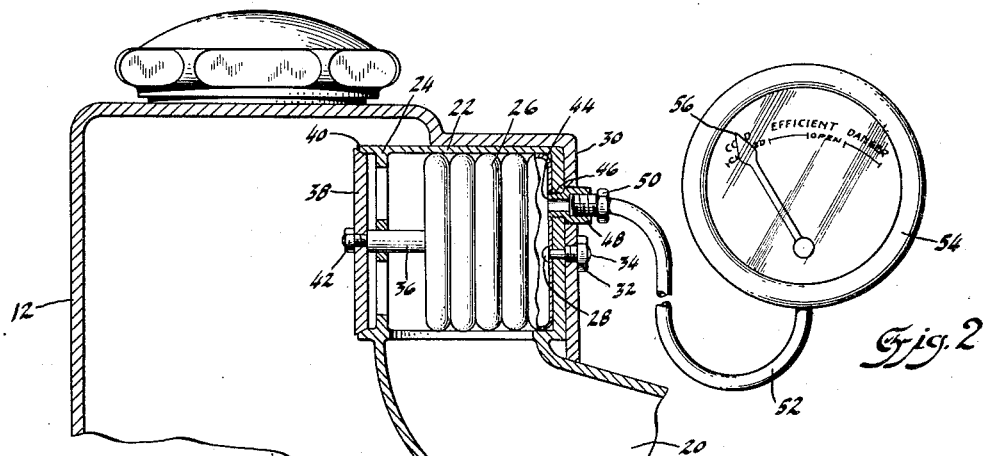
Figure 2 is an enlarged sectional detail of the upper portion of the radiator and showing the heat indicator.
Figure 3:
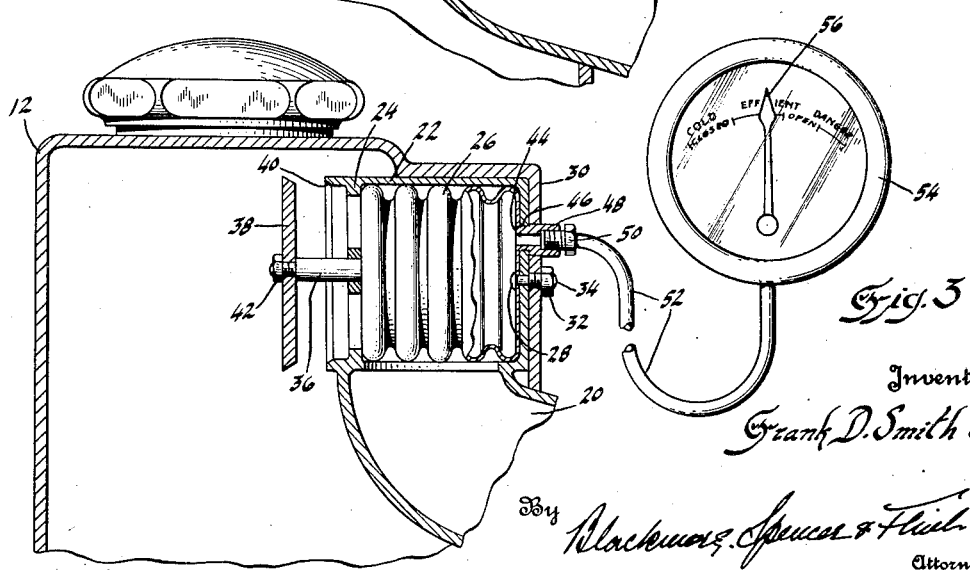
Figure 3 is a view similar to Figure 2 but showing the thermostat expanded to indicate the most efficient running of the engine.

Figure 2 shows the position of the parts when the engine is not running and the water in the cooling system is in a relatively cold condition. It will be noted that the thermostat 26 is in its complete contracted position and that the valve 38 rests on its seat 40 preventing the circulation of water through the cooling system. The pointer 56 is shown in Figure 2 at the extreme left of the scale which indicates the "cold" condition of the cooling system. As the engine starts running the water will heat up and as it reaches the thermostat the heat will cause the expansion of the fluid contained therein which in turn will expand the thermostat and unseat the valve 38. The unseating of the valve 38 will uncover the opening at the exposed end of the cup 22 and permit the more or less free circulation of the water in the cooling system. As the water becomes hotter it will cause a greater and greater expansion of the thermostat until the position of the parts as shown in Figure 3 is reached at which time the valve 38 will have reached its maximum open position. The pointer 56 will now be in its mid position on the scale and indicate the most efficient running of the engine.

Should the water in the cooling system become hotter it will cause an increased pressure in the thermostat due to increase in the heat applied to the liquid filler. This increased pressure will be transmitted through the tube 52 to the gauge or heat indicator 54 and will cause the pointer 56 to swing to the extreme right and indicate that the water in the circulating system has reached the danger point.

Pointer 56 also indicates whether the shut off valve is open or not. The system is sealed at a pressure below atmospheric and as a result when the cooling system is below a certain temperature the vapor pressure in thermostat 22 will be less than atmospheric pressure and the valve 38 will be closed. For all pressures above atmospheric whether due to heating the thermostat and expanding or vaporizing the liquid or to a leak in the thermostat system the valve will be open and the pointer will indicate accordingly. The region marked "Cold" is the closed position and either of those marked "Efficient" or "Danger" is the open position.

Inasmuch as many types of thermostats are in use and since they are applied at various places in the cooling system such as the water circulating pipes and the engine block, I do not limit myself to the specific thermostat shown nor to the application of the thermostat to the radiator alone.

I claim:

1. In combination with an automotive vehicle having an internal combustion engine equipped with a circulating water cooling system including a radiator and a water return pipe, an expandible and contractible heat responsive element positioned within the return pipe means operated by the element when heat is applied thereto to control the flow of water through the circulating system, and means connected with the interior of and responsive to the pressure within the element for indicating temperature changes.

2. In combination with the instrument board and the water cooling system of the engine of an automotive vehicle, an expandible and contractible thermostatic member within the cooling system, a heat sensitive liquid in said member, a stem on said member, a valve on said stem, said valve being operated by the expansion of said member for controlling the circulation of the water of the engine cooling system, a tube connected to the interior of said thermostatic member, and means at the end of said tube and located on the instrument board and responsive to the expansion of said liquid through the tube to indicate temperature changes.

3. In combination with the water cooling system of the engine of an automotive vehicle, said engine having a radiator though which the water circulates, a heat responsive element within the cooling system, a stem on said element, a valve on said stem for closing the inlet opening to the radiator, said valve operative to open said inlet and permit free circulation of the water of the engine cooling system upon the expansion of said element in response to changes in temperature, and means connected to the interior of said element to indicate the pressure within the same.

4. In combination with the water cooling system of the internal combustion engine of an automotive vehicle, a heat responsive element within the cooling system and in direct contact with the water thereof, a member for retaining said element, means connected with said member to limit the expansion of said element, and means connected with the interior of said element and responsive to pressure changes therein for indicating temperature variations in said system.

5. In combination with the radiator of the internal combustion engine of an automotive vehicle, said engine having a circulating water cooling system, a water inlet for said radiator, a heat responsive element mounted at the end of said inlet, means for limiting the expansion of said element, a valve operated by the expansion of said element to open the inlet and allow free circulation of the water in the cooling system, and means connected with the interior of and responsive to pressure within the element for indicating temperature changes in the water circulating system.

6. In combination with an automotive vehicle having an engine including a radiator, a means for indicating temperature changes in the water circulating system of the engine comprising a heat responsive element at the water inlet to the radiator, a housing in the system for said element, a valve at said housing opened by said heat responsive element to permit free circulation of water through the cooling system, means on said housing to limit the expansion of said heat responsive element, and means connected with the interior of and responsive to pressure within said element for indicating temperature changes in the water circulating system.

7. In combination with an internal combustion engine having a circulating water cooling system a heat responsive element positioned within said water cooling system means in the system and operated by said element when heat is applied thereto to control the flow of water through the cooling system, and means to indicate the movement of said first named means.

8. In combination with an internal combustion engine having a water cooling system including a water passage, a thermostat mounted within the cooling system, a valve controlled by said thermostat to open and close the fluid passage, and visible means operated by said thermostat to indicate whether said valve is open or closed.

9. In combination with the water cooling system of the internal combustion engine of an automotive vehicle having an instrument board, a heat responsive element within the cooling system and in direct contact with the water thereof, a member for retaining said element, a flange inside said member to limit the expansion of said element, and a gauge connected with the interior of said element and responsive to pressure changes therein for indicating temperature changes in said system, said gauge positioned at the instrument board of the vehicle.

10. In combination with an internal combustion engine having a circulating water cooling system including a water passage, a thermostat within the system and in direct contact with the water, a valve controlled by said thermostat to open and close said passage to thereby control the flow of water, and a pressure gauge connected to the interior of said thermostat to indicate whether said valve is open or closed.

In testimony whereof I affix my signature.
FRANK D. SMITH, Jr.